US012748058B2

(12) United States Patent
Umeno et al.

(10) Patent No.: US 12,748,058 B2
(45) Date of Patent: Sep. 29, 2026

(54) ABNORMALITY DETECTION DEVICE, ABNORMALITY DETECTION METHOD, AND NON-TRANSITORY COMPUTER-READABLE MEDIUM STORING ABNORMALITY DETECTION PROGRAM

(71) Applicant: Kyoto University, Kyoto (JP)

(72) Inventors: Ken Umeno, Kyoto (JP); Atsushi Ohno, Osaka (JP)

(73) Assignee: Kyoto University, Kyoto (JP)

( * ) Notice: Subject to any disclaimer, the term of this patent is extended or adjusted under 35 U.S.C. 154(b) by 521 days.

(21) Appl. No.: 18/548,848

(22) PCT Filed: Feb. 21, 2022

(86) PCT No.: PCT/JP2022/006970

§ 371 (c)(1),
(2) Date: Sep. 1, 2023

(87) PCT Pub. No.: WO2022/185971

PCT Pub. Date: Sep. 9, 2022

(65) Prior Publication Data

US 2024/0151657 A1 May 9, 2024

(30) Foreign Application Priority Data

Mar. 4, 2021 (JP) ................................ 2021-034087

(51) Int. Cl.
*G01N 22/00* (2006.01)

(52) U.S. Cl.
CPC .................................... *G01N 22/00* (2013.01)

(58) Field of Classification Search
CPC ........... G01N 22/00; G01V 1/00; G08B 21/10
See application file for complete search history.

(56) References Cited

U.S. PATENT DOCUMENTS

| | | | | |
|---|---|---|---|---|
| 7,277,797 B1 * | 10/2007 | Kunitsyn | ................. | G01V 1/01 702/15 |
| 2018/0196132 A1 * | 7/2018 | Xu | .......................... | G01S 7/032 |
| 2020/0233106 A1 | 7/2020 | Umeno et al. | | |

FOREIGN PATENT DOCUMENTS

| | | |
|---|---|---|
| CN | 111208535 A | 5/2020 |
| CN | 111708075 A | 9/2020 |

(Continued)

OTHER PUBLICATIONS

Akama, Kei, et al. "Traveling Ionospheric Disturbances Detection Using Time-Space Fourier Transform." IEICE Technical Report; IEICE Tech. Rep. 120.371 (2021): 57-62.

(Continued)

*Primary Examiner* — Tung S Lau
(74) *Attorney, Agent, or Firm* — Keating & Bennett, LLP

(57) ABSTRACT

Prediction accuracy of a regression model in abnormality determination of a TEC value is improved. Processing executed by an abnormality detection device includes: acquiring an observation value of each of a plurality of observation stations; selecting a central observation station from among the plurality of observation stations, and selecting a plurality of peripheral observation stations from among the plurality of observation stations on the basis of a distance from the central observation station; calculating a predicted observation value of the central observation station based on the observation value of each of the plurality of peripheral observation stations; calculating an estimation error between the predicted observation value and an actual measured value of the central observation station; and determining whether or not the actual measured value of the central observation station is abnormal based on the estimation error.

20 Claims, 15 Drawing Sheets

(56) References Cited

FOREIGN PATENT DOCUMENTS

| | | | | | |
|---|---|---|---|---|---|
| JP | 2008-058109 | A | | 3/2008 | |
| KR | 102043712 | B1 | | 11/2019 | |
| WO | WO 2018097272 | A1 | * | 5/2018 | ............... G01V 9/00 |

OTHER PUBLICATIONS

International Search Report and Written Opinion received in PCT App. No. PCT/JP2022/006970, as mailed Apr. 5, 2022.

* cited by examiner

FIG.11

1100A

| | ALERT PRESENT | NO ALERT |
|---|---|---|
| TARGET | 738 | 21659 |
| NOT TARGET | 10497 | 3027106 |

S1A S2A S3A S4A

1100B

| | ALERT PRESENT | NO ALERT |
|---|---|---|
| TARGET | 847 | 23981 |
| NOT TARGET | 92101 | 2482132 |

S1B S2B S3B S4B

FIG.12

1200A

| | | |
|---|---|---|
| REPRODUCTION RATE | S1/(S1+S2) | 0.03295084 |
| MATCHING RATE | S1/(S1+S3) | 0.06568758 |
| SPECIFICITY | S4/(S3+S4) | 0.99654431 |
| ACCURACY | (S1+S4)/(S1+S2+S3+S4) | 0.9894915 |
| F VALUE | 2/(1/REPRODUCTION RATE+1/ MATCHING RATE) | 0.04388677 |
| FALSE NEGATIVE RATE | S2/(S1+S2) | 0.96704916 |
| FALSE POSITIVE RATE | S3/(S3+S4) | 0.00345569 |

1200B

| | | |
|---|---|---|
| REPRODUCTION RATE | S1/(S1+S2) | 0.03411471 |
| MATCHING RATE | S1/(S1+S3) | 0.00911262 |
| SPECIFICITY | S4/(S3+S4) | 0.96422196 |
| ACCURACY | (S1+S4)/(S1+S2+S3+S4) | 0.95533695 |
| F VALUE | 2/(1/REPRODUCTION RATE+1/ MATCHING RATE) | 0.01438324 |
| FALSE NEGATIVE RATE | S2/(S1+S2) | 0.96588529 |
| FALSE POSITIVE RATE | S3/(S3+S4) | 0.03577804 |

ABNORMALITY DETECTION DEVICE, ABNORMALITY DETECTION METHOD, AND NON-TRANSITORY COMPUTER-READABLE MEDIUM STORING ABNORMALITY DETECTION PROGRAM

CROSS-REFERENCE TO RELATED APPLICATIONS

This application is the U.S. National Phase under 35 U.S.C. § 371 of International Application No. PCT/JP2022/006970, filed Feb. 21, 2022, designating the United States and published in Japanese on Sep. 9, 2022 as International Publication No. WO2022/185971, which claims priority to Japanese Application No. 2021-034087, filed Mar. 4, 2021, which is incorporated herein by reference in its entirety.

TECHNICAL FIELD

The present disclosure relates to an abnormality detection device, and more specifically, to a technique for detecting an abnormality in an ionosphere.

BACKGROUND ART

Free electrons repelled from atmospheric molecules by solar radiation float in an ionosphere (ionized layer) in the sky above the atmosphere. There is a possibility that an abnormality occurs in the ionosphere before occurrence of an earthquake, and it is expected to be useful, for example, for prediction of occurrence of an earthquake by detecting an electromagnetic abnormality in the ionosphere.

Nowadays, in addition to various seismometers, a dense observation network of global navigation satellite system (GNSS) reception stations (hereinafter, referred to as "observation station") for measuring crustal movement is constructed in the Japanese Archipelago. These observation stations can observe a total number of electrons (total electron content (TEC) value) in the ionosphere by communicating with a GNSS satellite.

Regarding detection of an electromagnetic abnormality of the ionosphere, for example, International publication No. WO 2018/097272 (PTL 1) discloses a computer in which "A computer calculates an amount of change from an observation start time in a total number of electrons in the ionosphere between an observation station on the ground and a satellite, on the basis of observation data of a signal received from the satellite by the observation station. The computer estimates the next calculated amount of change in the total number of electrons on the basis of a change over time in the amount of change in the total number of electrons in the ionosphere from the observation start time, and calculates a difference (estimation error) between the estimated amount of change in the total number of electrons and the actual calculated amount of change in the total number of electrons. The computer calculates a correlation value between the estimation error calculated for each observation station and the estimation error calculated for a certain number of observation stations in the vicinity of each observation station. If the correlation value calculated for each observation station is greater than or equal to a certain threshold value, the computer determines that an abnormality has occurred in the ionosphere between the observation station and the satellite if the correlation value for the certain number of observation stations in the vicinity of the observation station is also greater than or equal to the certain threshold value (see "ABSTRACT").

CITATION LIST

Patent Literature

PTL 1: International publication No. WO 2018/097272

SUMMARY OF INVENTION

Technical Problem

According to the technique disclosed in PTL 1, there is a case where abnormality determination of the TEC value is not correctly performed by prediction of a regression model in each observation station. Therefore, there is a need for a technique for improving prediction accuracy of a regression model in each observation station in abnormality determination of the TEC value.

The present disclosure has been made in view of the background described above, and an object in one aspect is to provide a technique for improving prediction accuracy of a regression model in each observation station in abnormality determination of a TEC value.

Solution to Problem

According to an embodiment, an abnormality detection device is provided. The abnormality detection device includes an input unit that acquires an observation value of each of a plurality of observation stations that are for observation of a number of electrons in an ionosphere, and a controller that determines an abnormality in the observation value. The controller performs: selecting a central observation station from among the plurality of observation stations; selecting a plurality of peripheral observation stations from among the plurality of observation stations based on a distance from the center observation station; calculating a predicted observation value of the central observation station based on the observation value of each of the plurality of peripheral observation stations; calculating an estimation error between the predicted observation value and an actual measured value of the central observation station; and determining whether or not the actual measured value of the central observation station is abnormal, based on the estimation error.

In one aspect, the abnormality detection device further includes a storage unit that stores information about a first distance and information about a second distance. The selecting the plurality of peripheral observation stations from among the plurality of observation stations based on a distance from the central observation station includes selecting the plurality of peripheral observation stations from a region in which a distance from the central observation station is greater than or equal to the first distance and less than or equal to the second distance.

In one aspect, the storage unit further stores information about a third distance. The selecting the plurality of peripheral observation stations from among the plurality of observation stations based on a distance from the central observation station includes: determining each of the peripheral observation stations as a virtual weight; calculating a position of a center of gravity of a weight of the selected plurality of peripheral observation stations; and selecting the plurality of peripheral observation stations such that a distance from the central observation station to the center of gravity is less than or equal to the third distance.

In one aspect, the calculating the predicted observation value of the central observation station based on the observation value of each of the plurality of peripheral observation stations includes calculating the predicted observation value of the central observation station based on an average value of the observation values of the plurality of peripheral observation stations each.

In one aspect, the calculating the predicted observation value of the central observation station based on the observation value of each of the plurality of peripheral observation stations includes calculating the predicted observation value of the central observation station based on a median value of the observation values of the plurality of peripheral observation stations each.

In one aspect, the selecting the central observation station includes selecting each of observation stations included in the plurality of observation stations as the central observation station. The calculating the estimation error includes repeatedly calculating the estimation error when each of the observation stations is selected as the central observation station.

In one aspect, the determining whether or not the actual measured value of the central observation station is abnormal based on the estimation error includes: calculating a correlation value between the estimation error of the central observation station and the estimation errors of a plurality of the observation stations present around the central observation station; and determining that the actual measured value of the central observation station is abnormal based on a fact that the correlation value is greater than or equal to a predetermined threshold value.

In one aspect, the determining whether or not the actual measured value of the central observation station is abnormal based on the estimation error includes: calculating a correlation value between the estimation error of the central observation station and the estimation errors of a plurality of the observation stations present around the central observation station; calculating a median value and a standard deviation of the correlation values of the central observation station; calculating a relative value indicating a degree of difference between the correlation value and the median value of the central observation station, based on the median value and the standard deviation; and determining that the actual measured value of the central observation station is abnormal based on a fact that the relative value is greater than or equal to a predetermined threshold value.

In one aspect, the abnormality detection device further includes an output unit that outputs an alert. The output unit outputs an alert based on a fact that the actual measured value of the central observation station is determined to be abnormal.

According to another embodiment, a method for detecting an abnormality in a number of electrons in the ionosphere is provided. The method includes: acquiring an observation value of each of a plurality of observation stations that are for observation of a number of electrons in an ionosphere; selecting a central observation station from among the plurality of observation stations; selecting a plurality of peripheral observation stations from among the plurality of observation stations based on a distance from the central observation station; calculating a predicted observation value of the central observation station based on the observation value of each of the plurality of peripheral observation stations; calculating an estimation error between the predicted observation value and an actual measured value of the central observation station; and determining whether or not the actual measured value of the central observation station is abnormal, based on the estimation error.

In one aspect, the selecting the plurality of peripheral observation stations from among the plurality of observation stations based on a distance from the central observation station includes selecting the plurality of peripheral observation stations from a region in which a distance from the central observation station is greater than or equal to a first distance and less than or equal to a second distance.

In one aspect, the selecting the plurality of peripheral observation stations from among the plurality of observation stations based on a distance from the central observation station includes; determining each of the peripheral observation stations as a virtual weight; calculating a position of a center of gravity of a weight of the selected plurality of peripheral observation stations; and selecting the plurality of peripheral observation stations such that a distance from the central observation station to the center of gravity is less than or equal to a third distance.

In one aspect, the calculating the predicted observation value of the central observation station based on the observation value of each of the plurality of peripheral observation stations includes calculating the predicted observation value of the central observation station based on an average value of the observation values of the plurality of peripheral observation stations each.

In one aspect, the calculating the predicted observation value of the central observation station based on the observation value of each of the plurality of peripheral observation stations includes calculating the predicted observation value of the central observation station based on a median value of the observation values of the plurality of peripheral observation stations each.

In one aspect, the selecting the central observation station includes selecting each of observation stations included in the plurality of observation stations as the central observation station, and the calculating the estimation error includes repeatedly calculating the estimation error when each of the observation stations is selected as the central observation station.

In one aspect, the determining whether or not the actual measured value of the central observation station is abnormal based on the estimation error includes: calculating a correlation value between the estimation error of the central observation station and the estimation errors of a plurality of the observation stations present around the central observation station; and determining that the actual measured value of the central observation station is abnormal based on a fact that the correlation value is greater than or equal to a predetermined threshold value.

In one aspect, the determining whether or not the actual measured value of the central observation station is abnormal based on the estimation error includes: calculating a correlation value between the estimation error of the central observation station and the estimation errors of a plurality of the observation stations present around the central observation station; calculating a median value and a standard deviation of the correlation values of the central observation station; calculating a relative value indicating a degree of difference between the correlation value and the median value of the central observation station, based on the median value and the standard deviation; and determining that the actual measured value of the central observation station is abnormal based on a fact that the relative value is greater than or equal to a predetermined threshold value.

In one aspect, the method further includes outputting an alert based on a fact that the actual measured value of the central observation station is determined to be abnormal.

According to another embodiment, a program for causing a computer to execute the method described above is provided.

Advantageous Effects of Invention

According to an embodiment, it is possible to improve prediction accuracy of a regression model in each observation station in abnormality determination of a TEC value.

The foregoing and other objects, features, aspects and advantages of the contents of disclosure will become more apparent from the following detailed description of the present disclosure when taken in conjunction with the accompanying drawings.

BRIEF DESCRIPTION OF DRAWINGS

FIG. 11 is a view illustrating an example of a simulation execution result of each of abnormality detection device 320 and a conventional device.

FIG. 12 is a view illustrating an example of an analysis result of a simulation execution result.

DESCRIPTION OF EMBODIMENTS

Figure 1:
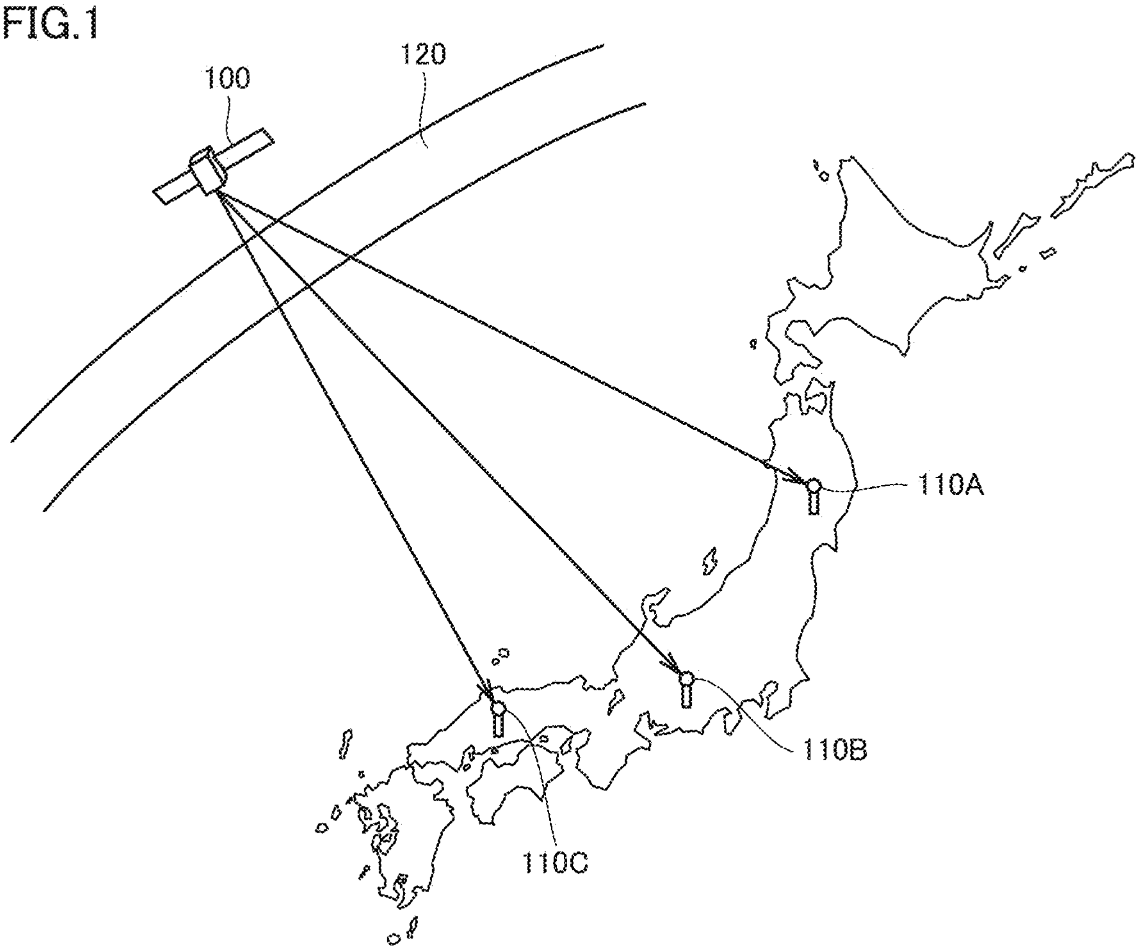
FIG. 1 is a view illustrating an example of an overall image of a TEC value observation system according to an embodiment.

Hereinafter, an embodiment of a technical idea according to the present disclosure will be described with reference to the drawings. In the following description, the same components are denoted by the same reference numerals. Names and functions thereof are also the same. Therefore, detailed descriptions thereof will not be repeated. Note that, in the following description, when referring to a plurality of same configurations, the configurations may be expressed as configurations 123A and 123B. In addition, when the configurations are collectively referred to, the configurations are expressed as a configuration 123.

FIG. 1 is a view illustrating an example of an overall image of a TEC value observation system according to the present embodiment. This system includes a GNSS satellite 100 and an observation station 110. In the example illustrated in FIG. 1, observation stations 110A, 110B, and 110C are illustrated, but this is an example, and more observation stations 110 may be arranged in practice.

An ionosphere 120, which is a region where molecules and atoms are ionized by sunlight or the like, exists in an upper layer portion of the atmosphere surrounding the earth. It is known that a total number of electrons (TEC value) in ionosphere 120 has a characteristic of having a natural change depending on a change of day and night and a season, and also greatly varies depending on space weather such as solar flare. In addition, it is known that these changes (in particular, solar flare) cause radio wave interference and the like on the ground. Recent research reports that the TEC value in the sky above an earthquake center increases also before occurrence of a large-scale earthquake, and application of an observation technology of the TEC value to earthquake prediction is expected.

A TEC value analysis method according to the present embodiment is to predict an abnormality in ionosphere 120, and uses an observation result obtained by the TEC value observation system. The TEC value observation system observes a TEC value of ionosphere 120 by using radio wave communication between GNSS satellite 100 and observation station 110. The GNSS satellite communicates with each of the plurality of observation stations 110 installed on the ground surface by using radio waves of two frequencies. The TEC value on a radio wave path is obtained by calculating a phase difference between the radio waves of two frequencies in ionosphere 120. The obtained TEC value is accumulated in a server (not illustrated) included in the TEC value observation system.

Figure 2:
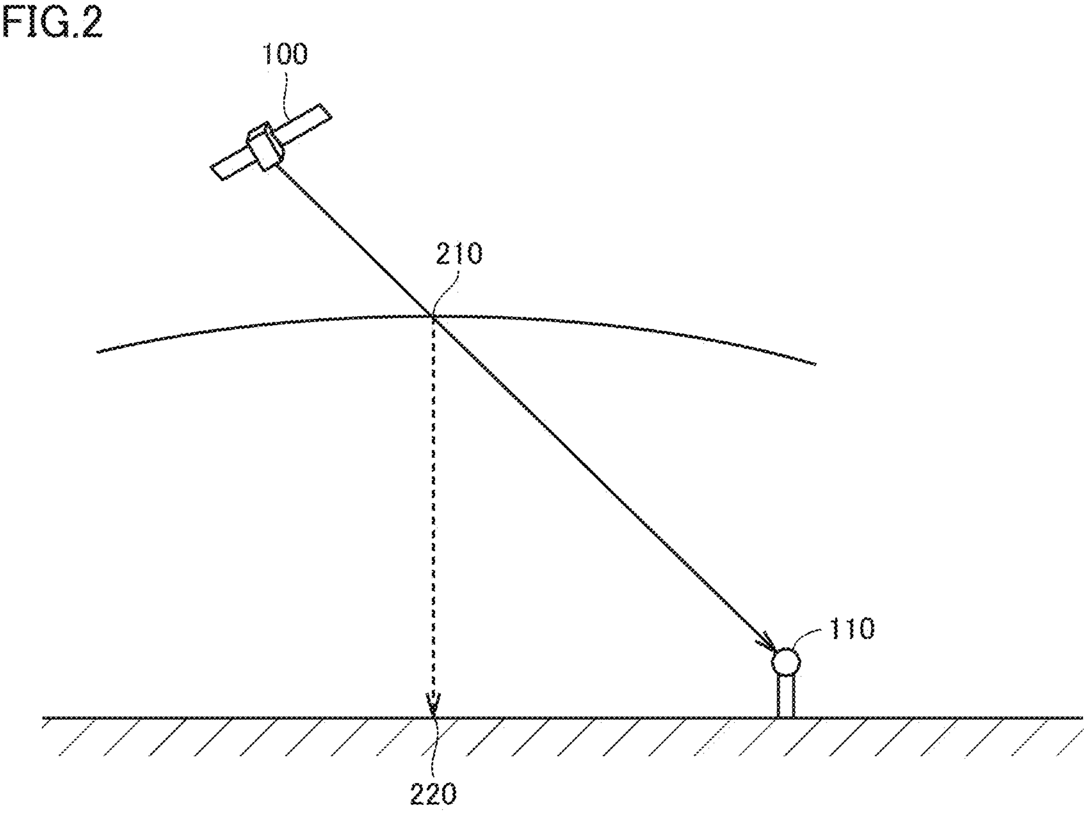
FIG. 2 is a view illustrating an example of an observation procedure of the TEC value observation system.

FIG. 2 is a view illustrating an example of an observation procedure of the TEC value observation system. With reference to FIG. 2, a method for calculating a TEC value for each place in the TEC value observation system will be described. A point at which a line (communication path) connecting GNSS satellite 100 and observation station 110 on the ground intersects with a surface of ionosphere 120 is referred to as ionospheric penetration point (IPP) 210. Then, a position where IPP 210 is projected on the ground is referred to as subionospheric point (SIP) 220.

In the example illustrated in FIG. 2, a TEC value calculated by communication between GNSS 100 and observation station 110 is a TEC value in the sky above SIP 220. SIP 220 can be calculated on the basis of a position of each of GNSS satellite 100 and observation station 110, IPP 210, a radius of the earth, information about an altitude to ionosphere 120, and the like. In one aspect, the altitude of ionosphere 120 may be set to, for example, an altitude of about 300 km.

TEC values obtained by the TEC value observation system are susceptible to an effect of various natural phenomena such as solar flare. In order to correctly detect an increase or a decrease of the TEC values, it is important to remove the effect of these natural phenomena as much as possible.

Figure 3:
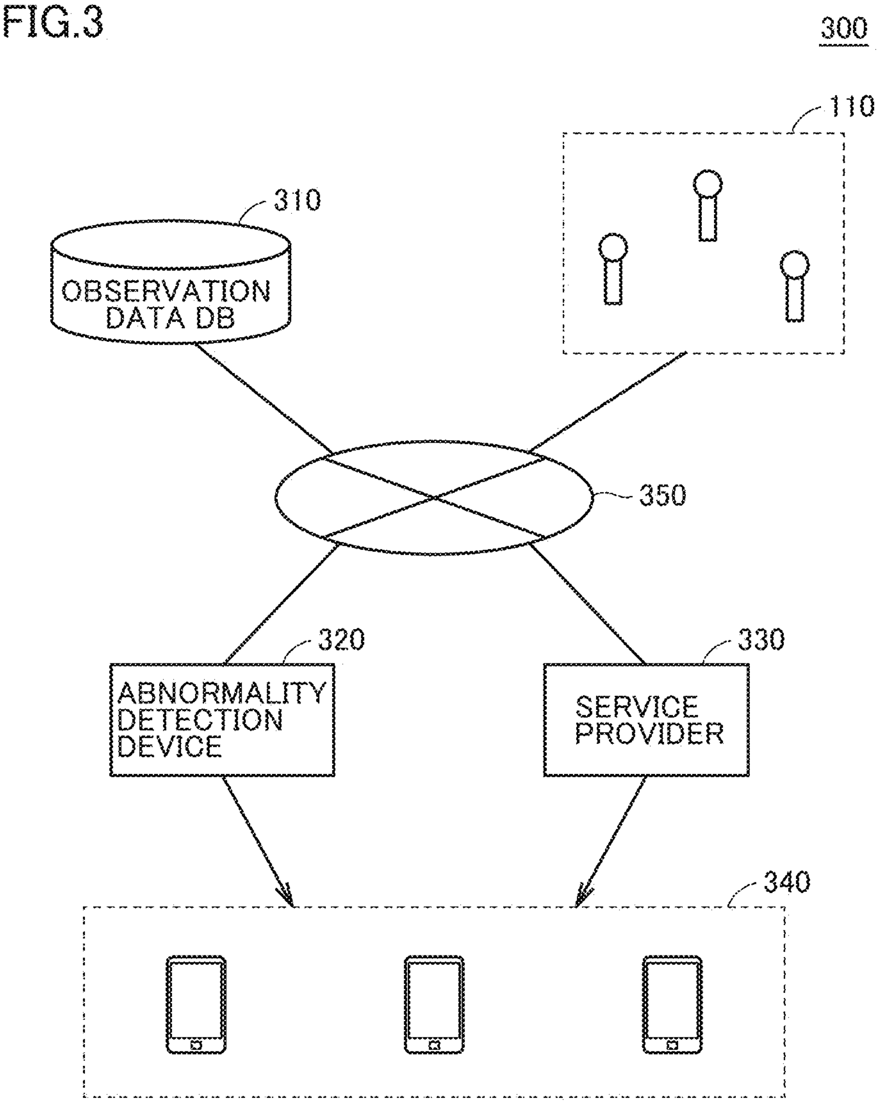
FIG. 3 is a diagram illustrating an example of a configuration of an abnormality detection system 300 according to an embodiment.

FIG. 3 is a diagram illustrating an example of a configuration of an abnormality detection system 300 according to the present embodiment. Abnormality detection system 300 can acquire and analyze TEC values obtained by the TEC value observation system, to detect or predict an abnormality in the TEC value at each location (SIP 220).

Abnormality detection system 300 includes a plurality of observation stations 110, an observation data database (DB) 310, an abnormality detection device 320, a service provider 330, and a user terminal 340. The plurality of observation stations 110, observation data DB 310, abnormality detection device 320, and service provider 330 are configured to be able to communicate with each other via a network 350.

In one aspect, abnormality detection system 300 may include only abnormality detection device 320. In this case, abnormality detection system 300 can cooperate with the plurality of observation stations 110, observation data DB 310, abnormality detection device 320, service provider 330, and user terminal 340 which are external devices or services.

Observation station 110 communicates with GNSS satellite 100 to observe a TEC value in each SIP 220. Observation station 110 transmits the acquired observation value to observation data DB 310. A large number of observation stations 110 may be arranged in an area where the TEC value in the sky above is observed.

Observation data DB 310 acquires and stores observation values from the plurality of observation stations 110. Observation data DB 310 can be arranged in any device such as a server. In one aspect, the observation value may be a TEC value. In this case, the server including observation data DB 310 stores the observation value as the TEC value into observation data DB 310. In another aspect, the observation value may include delay information regarding communication between GNSS satellite 100 and observation station 110, position information regarding GNSS satellite 100, position information regarding observation station 110, and the like. In that case, the server including observation data DB 310 can calculate the TEC value from the information included in the observation value, and store the TEC value into observation data DB 310.

Furthermore, in another aspect, observation data DB 310 may be expressed as a table of a relational database, or may be expressed in any other data format such as JavaScript (registered trademark) Object Notation (JSON). Further, in another aspect, observation station 110, observation data DB 310, and GNSS satellite 100 described above can constitute the TEC value observation system.

The observation data of the TEC value of observation station 110 is acquired from observation data DB 310. In one aspect, abnormality detection device 320 may calculate an observation result of the TEC value on the basis of observation data of observation station 110. Abnormality detection device 320 detects or predicts a magnetic abnormality in the ionosphere from the acquired TEC value, and distributes an alert to user terminal 340 as necessary. In one aspect, abnormality detection device 320 may provide an alert to service provider 330. In another aspect, abnormality detection device 320 can be implemented as a personal computer (PC), a server, or a cloud service.

Service provider 330 can provide user terminal 340 with various forecasts, a value added service utilizing the forecasts, or the like on the basis of information acquired from abnormality detection device 320. In one aspect, service provider 330 may be implemented as a server or a cloud service. In another aspect, a function of service provider 330 may be included in abnormality detection device 320.

User terminal 340 can acquire an alert from abnormality detection device 320 or service provider 330, and display a content of the alert on a display. In one aspect, user terminal 340 may be a PC, a smartphone, a tablet, a wearable device, a television, a radio, or any other device.

Figure 4:
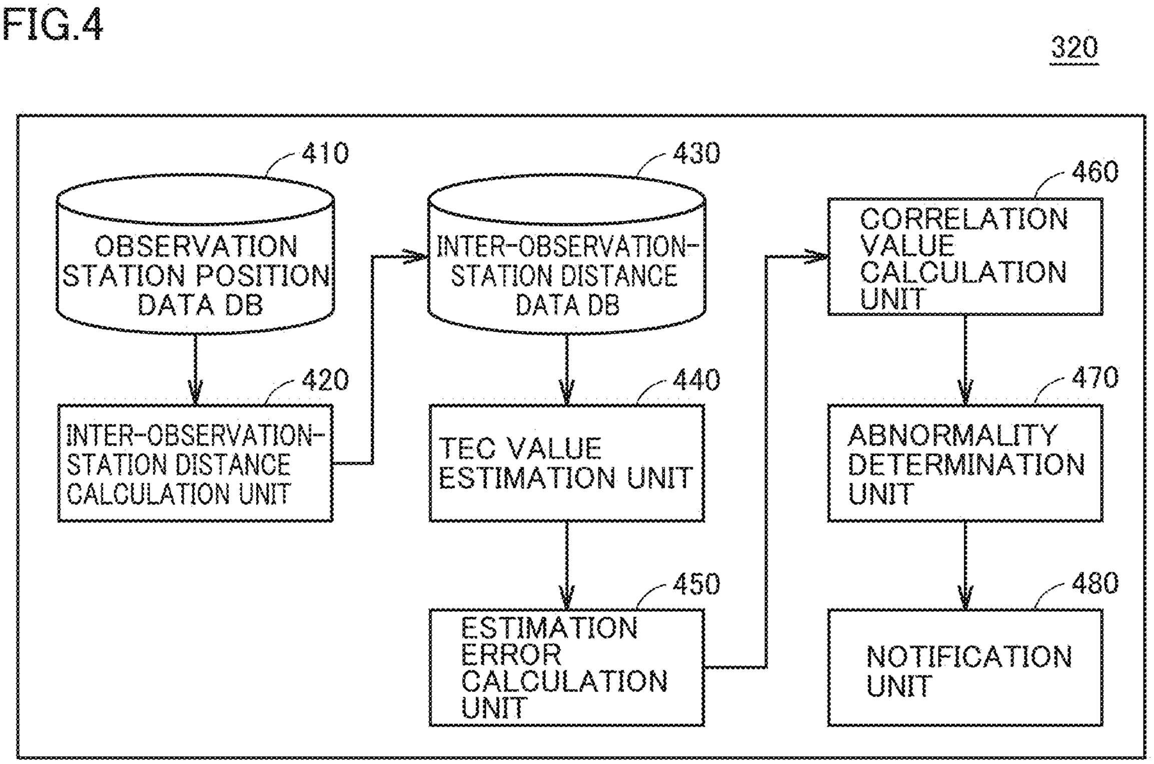
FIG. 4 is a diagram illustrating an example of a functional configuration of an abnormality detection device 320.

FIG. 4 is a diagram illustrating an example of a functional configuration of abnormality detection device 320. In one aspect, the configuration illustrated in FIG. 4 may be implemented as software, and in that case, these configurations can be executed by hardware illustrated in FIG. 5.

Abnormality detection device 320 includes an observation station position data DB 410, an inter-observation-station distance calculation unit 420, an inter-observation-station distance data DB 430, a TEC value estimation unit 440, an estimation error calculation unit 450, a correlation value calculation unit 460, an abnormality determination unit 470, and a notification unit 480. In one aspect, observation station position data DB 410 and inter-observation-station distance data DB 430 may be expressed as a table of a relational database, or may be expressed in any other data format such as JSON.

Observation station position data DB 410 stores position information regarding each observation station 110. In one aspect, the position information may be information indicating latitude or longitude. In another aspect, the position information may be, for example, information indicating each region in a case where an observation target region (the Japanese Archipelago or the like) is divided into any regions, such as a grid.

Inter-observation-station distance calculation unit 420 calculates a distance between observation stations 110. In one aspect, inter-observation-station distance calculation unit 420 may calculate a distance between observation stations 110 on the basis of a difference in latitude and longitude between two observation stations 110. In another aspect, inter-observation-station distance calculation unit 420 may calculate a distance between two observation stations 110 on the basis of the number of squares by which two observation stations 110 are separated on the grid. In this case, inter-observation-station distance calculation unit 420 can calculate a distance between two observation stations 110 by multiplying the number of squares between two observation stations 110 by a distance per square.

Inter-observation-station distance data DB 430 stores distance data between observation stations 110. In one aspect, inter-observation-station distance data DB 430 can store an identifier of each of two observation stations 110 and a distance between two observation stations 110 in association with each other. Further, in another aspect, the unit of distance may be any unit such as meter or kilometer.

TEC value estimation unit 440 selects one observation station 110 from among the plurality of observation stations 110 as a central observation station, and creates a regression model of a TEC value in the central observation station. The regression model of the TEC value in the central observation station is created on the basis of observation results of a plurality of peripheral observation stations located around the central observation station. The regression model in the central observation station indicates an approximate value of a TEC value predicted to be observed by the central observation station when no magnetic abnormality occurs in the ionosphere (a regression model based on an observation result of the peripheral observation station). Details of processing of TEC value estimation unit 440 will be described with reference to FIGS. 6 and 7.

Estimation error calculation unit 450 compares a value (predicted value) at a certain time t obtained from the regression model of the central observation station with an actual measured value of the central observation station at the certain time t, and calculates an estimated error (difference between an actual measured value and the predicted value). At that time, abnormality detection device 320 can acquire the actual measured value of the central observation station at certain time t from observation data DB 310. Details of processing of estimation error calculation unit 450 will be described with reference to FIG. 8. TEC value estimation unit 440 and estimation error calculation unit 450 sequentially select each of all observation stations 110 as the central observation station, and repeatedly execute the above processing.

Correlation value calculation unit 460 executes processing on the basis of an estimation error of each observation station 110 output by estimation error calculation unit 450. Correlation value calculation unit 460 selects one observation station as the central observation station, and selects a plurality of observation stations around the one observation station, as the peripheral observation stations. In one aspect, correlation value calculation unit 460 can select any number of peripheral observation stations from among observation stations 110 whose distances from the central observation stations are within a predetermined distance.

Next, correlation value calculation unit 460 calculates a correlation value between an estimation error in the central observation station at certain time t and an estimation error of each of the peripheral observation stations at certain time t. The estimation error in the central observation station and the estimation error in each of the peripheral observation stations are calculated on the basis of an observation value (TEC value) at the same time t. Correlation value calculation unit 460 sequentially selects each of all observation stations 110 as the central observation station, and repeatedly executes the correlation value calculation processing described above. In one aspect, correlation value calculation unit 460 may calculate the correlation value of the central observation station by using a known technique. For example, correlation value calculation unit 460 may execute correlation value calculation disclosed in PTL 1.

Furthermore, correlation value calculation unit 460 calculates a relative value on the basis of the correlation value in each observation station 110 at certain time t. Correlation value calculation unit 460 calculates a median value and a standard deviation of the correlation values in individual observation stations 110 at certain time t. Then, correlation value calculation unit 460 calculates a relative value indicating how much the correlation value of each observation station 110 differs from the median value of the correlation values, on the basis of the calculated median value and standard deviation of the correlation values. Correlation value calculation unit 460 repeatedly executes the relative value calculation processing described above for each correlation value of all observation stations 110. Correlation value calculation unit 460 may calculate the relative value of each observation station 110 by using a known technique. For example, correlation value calculation unit 460 may execute relative value calculation disclosed in PTL 1.

Abnormality determination unit 470 determines whether or not a relative value of each of all observation stations 110 at a certain time is greater than or equal to a predetermined threshold value. For example, abnormality determination unit 470 can determine that an observation value (TEC value) of observation station 110A is abnormal on the basis of a fact that the relative value of observation station 110A is greater than or equal to a predetermined threshold value. In one aspect, abnormality determination unit 470 may determine whether or not an observation value (TEC value) of observation station 110A is abnormal by determining whether or not the correlation value is greater than or equal to a predetermined threshold value without calculating the relative value. In that case, abnormality determination unit 470 can determine that the observation value (TEC value) of observation station 110A is abnormal on the basis of a fact that the correlation value is greater than or equal to a predetermined threshold value.

Notification unit 480 outputs an alert when abnormality determination unit 470 determines that an observation value of a certain observation station 110 is abnormal. In one aspect, even when abnormality determination unit 470 does not detect an abnormality, notification unit 480 can output a notification notifying that there is no abnormality in the observation value. In another aspect, the alert may include intensity information. For example, the intensity information may be determined on the basis of how much the correlation value or the relative value of observation station 110 is greater than a predetermined threshold value.

Figure 5:
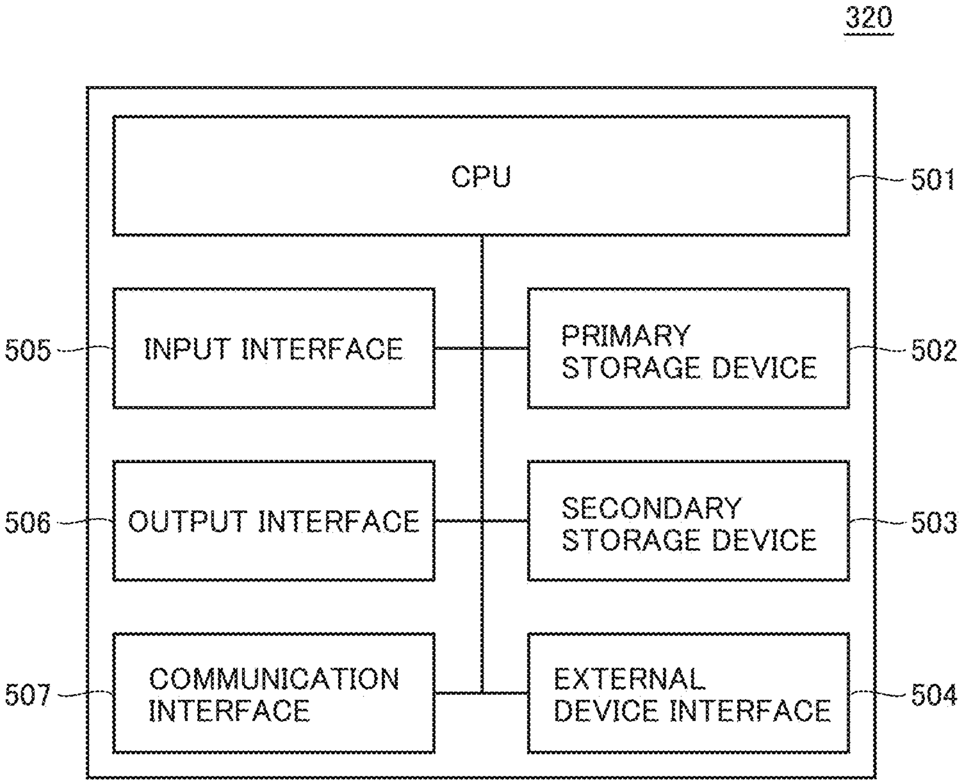
FIG. 5 is a diagram illustrating an example of a configuration of abnormality detection device 320.

FIG. 5 is a diagram illustrating an example of a configuration of abnormality detection device 320. Abnormality detection device 320 includes a central processing unit (CPU) 501, a primary storage device 502, a secondary storage device 503, an external device interface 504, an input interface 505, an output interface 506, and a communication interface 507.

CPU 501 can execute a program for realizing various functions of abnormality detection device 320. CPU 501 includes, for example, at least one integrated circuit. The integrated circuit may include, for example, at least one CPU, at least one field programmable gate array (FPGA), or a combination thereof.

Primary storage device 502 stores a program to be executed by CPU 501, and data to be referred to by CPU 501. In one aspect, primary storage device 502 may be realized by a dynamic random access memory (DRAM), a static random access memory (SRAM), or the like.

Secondary storage device 503 is a nonvolatile memory, and may store a program to be executed by CPU 501 and data to be referred to by CPU 501. In this case, CPU 501 executes a program read from secondary storage device 503 to primary storage device 502, and refers to data read from secondary storage device 503 to primary storage device 502. In one aspect, secondary storage device 503 may be realized by a hard disk drive (HDD), a solid state drive (SSD), an erasable programmable read only memory (EPROM), an electrically erasable programmable read only memory (EEPROM), a flash memory, or the like.

External device interface 504 can be connected to any external device such as a printer, a scanner, and an external HDD. In one aspect, external device interface 504 may be implemented by a universal serial bus (USB) terminal or the like.

Input interface 505 may be connected to any input device such as a keyboard, a mouse, a touch-pad, or a game pad. In one aspect, input interface 505 may be realized by a USB terminal, a PS/2 terminal, a Bluetooth (registered trademark) module, or the like.

Output interface 506 may be connected to any output device such as a cathode ray tube display, a liquid crystal display, or an organic electro-luminescence (EL) display. In one aspect, output interface 506 may be realized by a USB terminal, a D-sub terminal, a digital visual interface (DVI)

terminal, a high-definition multimedia interface (HDMI) (registered trademark) terminal, or the like.

Communication interface 507 is connected to a wired or wireless network device. In one aspect, communication interface 507 may be realized by a wired local area network (LAN) port, a wireless fidelity (Wi-Fi (registered trademark)) module, or the like. In another aspect, communication interface 507 may transmit and receive data by using a communication protocol such as a transmission control protocol/Internet protocol (TCP/IP) or a user datagram protocol (UDP).

Figure 6:
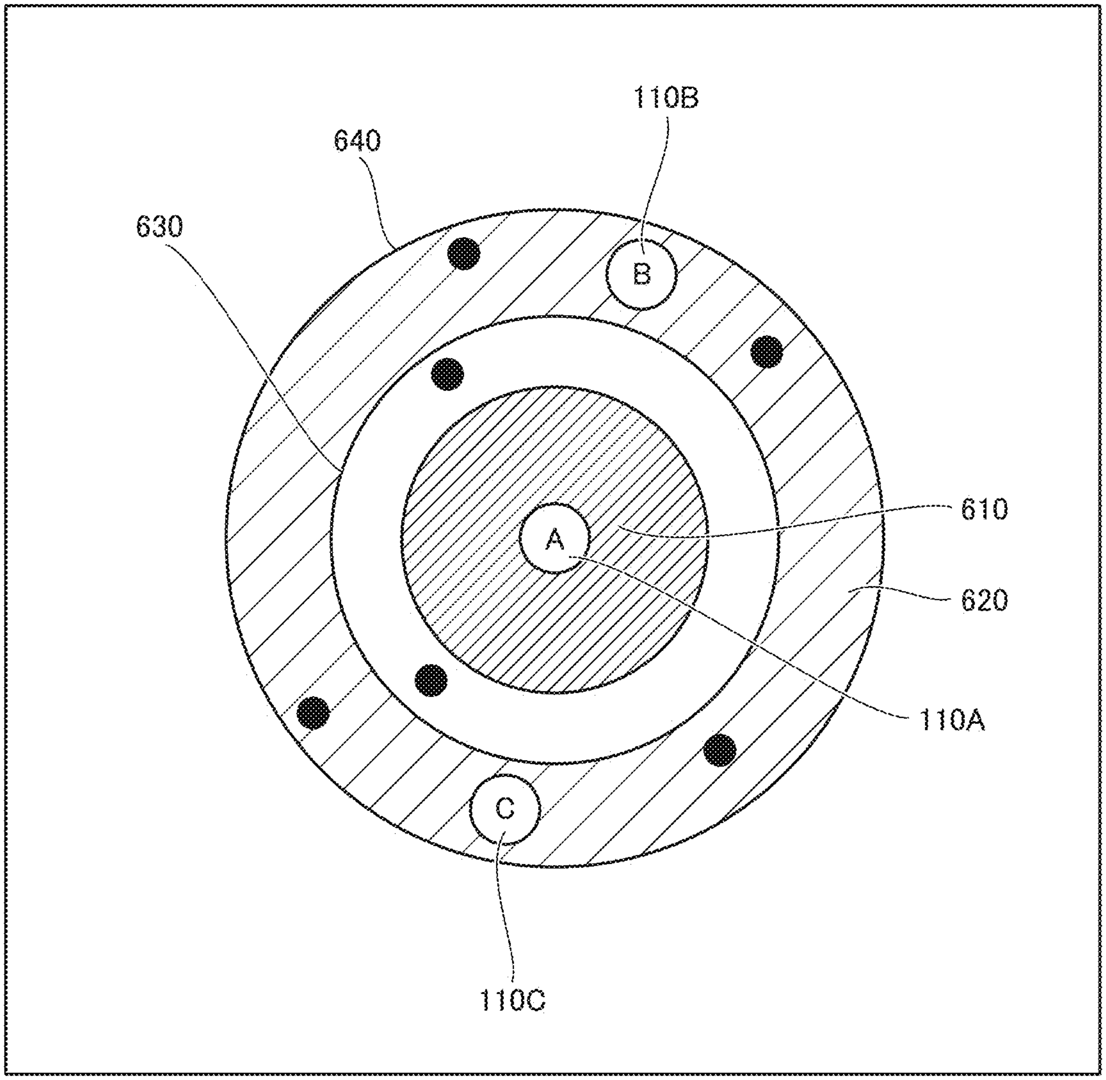
FIG. 6 is a view illustrating an example of processing of creating a regression model of a TEC value by a TEC value estimation unit 440.

FIG. 6 is a view illustrating an example of processing of creating a regression model of a TEC value by TEC value estimation unit 440. First, TEC value estimation unit 440 selects one observation station 110 as a "central observation station". As an example, it is assumed that observation station 110A has been selected as the central observation station.

Next, TEC value estimation unit 440 selects a plurality of "peripheral observation stations" from a region 620 in which a distance from observation station 110A is, for example, greater than or equal to a first distance (radius) 630 and less than or equal to a second distance (radius) 640. In one aspect, information about first distance 630 and information about second distance 640 may be stored in secondary storage device 503. In that case, TEC value estimation unit 440 can acquire the information about first distance 630 and the information about second distance 640 from secondary storage device 503. In another aspect, TEC value estimation unit 440 may determine each of the peripheral observation stations as a virtual weight, and calculate a position of a center of gravity of these weights. In that case, TEC value estimation unit 440 may select the peripheral observation stations such that a distance from the central observation station to the center of gravity is less than or equal to a predetermined third distance (radius). In this way, TEC value estimation unit 440 can select the peripheral observation station without unevenness as viewed from the central observation station. Further, information about the third distance may be stored in secondary storage device 503. TEC value estimation unit 440 can acquire information about the third distance from secondary storage device 503.

As an example, it is assumed that TEC value estimation unit 440 selects observation stations 110B and 110C as the peripheral observation stations. In this case, a regression model of observation station 110A (central observation station) is generated on the basis of observation results of TEC values in observation stations 110B and 110C (peripheral observation stations). In one aspect, the regression model of the central observation station may be generated on the basis of an average value of observation results of TEC values in the peripheral observation station. In another aspect, the regression model of the central observation station may be generated on the basis of a median value of observation results of TEC values in the peripheral observation stations.

Since observation stations 110B and 110C in region 620 are close to observation station 110A (central observation station) in a region 610, observation stations 110B and 110C are predicted to detect TEC values close to TEC values of observation station 110A in normal times. In addition, for example, even when an earthquake occurs in region 610, since there is a certain distance between regions 610 and 620, it is expected that the ionosphere in the sky above region 620 is less susceptible to an effect of the earthquake occurring in region 610.

Therefore, if a magnetic abnormality in the ionosphere occurs in region 610 due to an earthquake, it is expected that a difference will occur between an observation result of the TEC value obtained by observation station 110A in region 610 and observation results of the TEC value obtained by observation stations 110B and 110C in region 620. In one aspect, first distance 630 and second distance 640 may be distances set to be outside an effect range of a local natural phenomenon such as an earthquake, on the basis of data of a natural phenomenon such as a past earthquake.

TEC value estimation unit 440 compares a regression model generated on the basis of the TEC values of the plurality of peripheral observation stations with an actual measured value of the TEC value obtained by observation station 110A, and detects an estimation error. The estimation error is used to detect an abnormality in the TEC value of the ionosphere, as will be described with reference to FIGS. 8 and 9.

Figure 7:
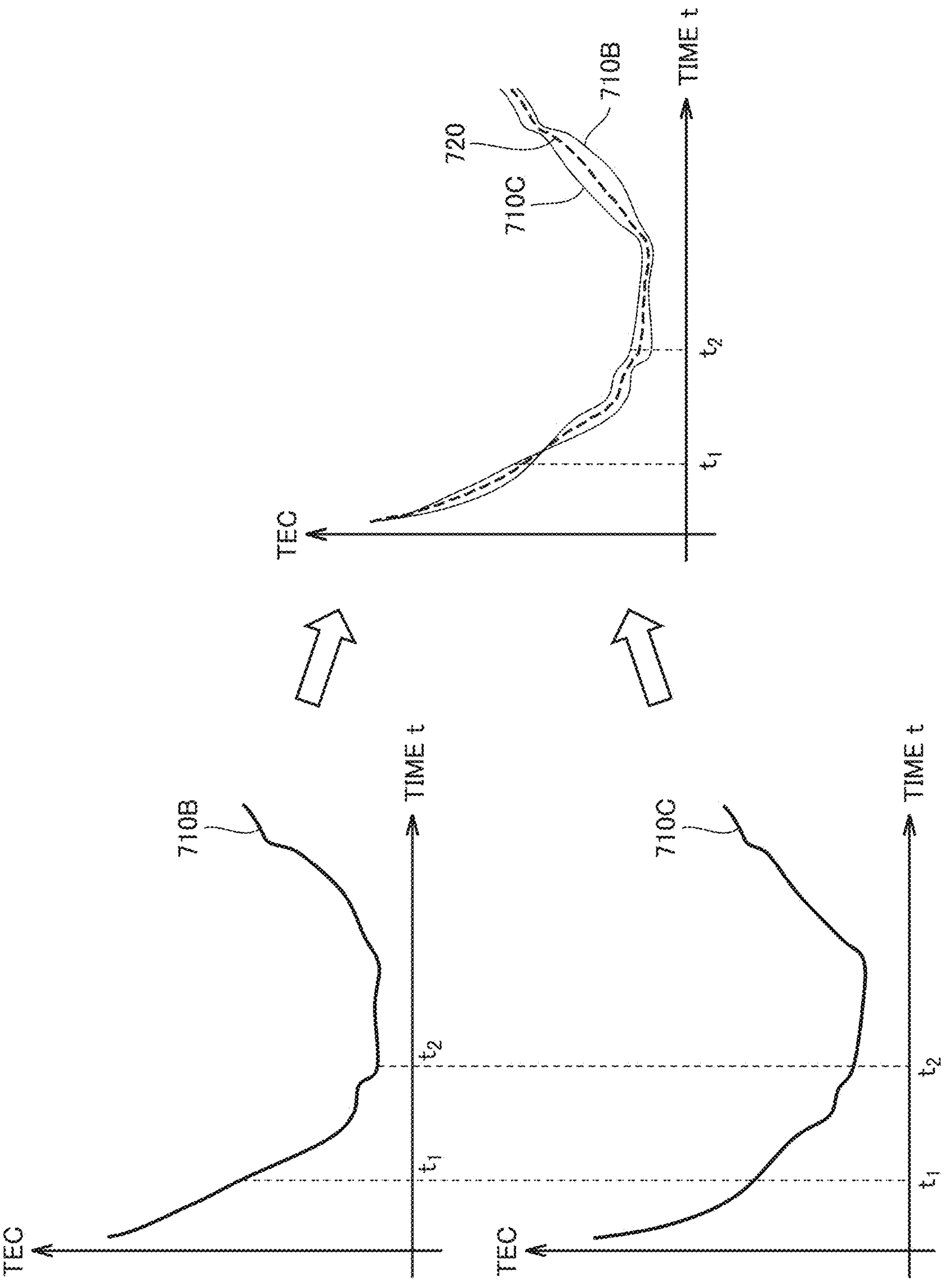
FIG. 7 is a graph illustrating an example of details of a procedure of creating a regression model of a central observation station.

FIG. 7 is a graph illustrating an example of details of a procedure of creating a regression model of the central observation station. The processing illustrated in FIG. 7 can be executed by TEC value estimation unit 440. TEC value estimation unit 440 acquires an actual measured value of the TEC value of each of the peripheral observation stations. Then, TEC value estimation unit 440 generates (estimates) a regression model of the central observation station, on the basis of the actual measured values of the TEC values of these peripheral observation stations.

As an example, a description will be given to a procedure of creating a regression model 720 of the central observation station on the basis of an actual measured value 710B of the TEC value obtained by observation station 110B selected from region 620 and actual measured value 710C of the TEC value obtained by observation station 110C selected from region 620.

First, TEC value estimation unit 440 acquires actual measured value 710B in observation station 110B. Similarly, TEC value estimation unit 440 acquires actual measured value 710C in observation station 110C. In one aspect, actual measured values 710B and 710C can be acquired from observation data DB 310.

Next, TEC value estimation unit 440 generates regression model 720 of observation station 110A (central observation station) on the basis of an average value, a median value, or the like of actual measured value 710B of observation station 110B and actual measured value 710C of observation station 110C. A value of regression model 720 at a time t indicates a predicted value of a TEC value expected to be output by observation station 110A at time tin normal times.

Figure 8:
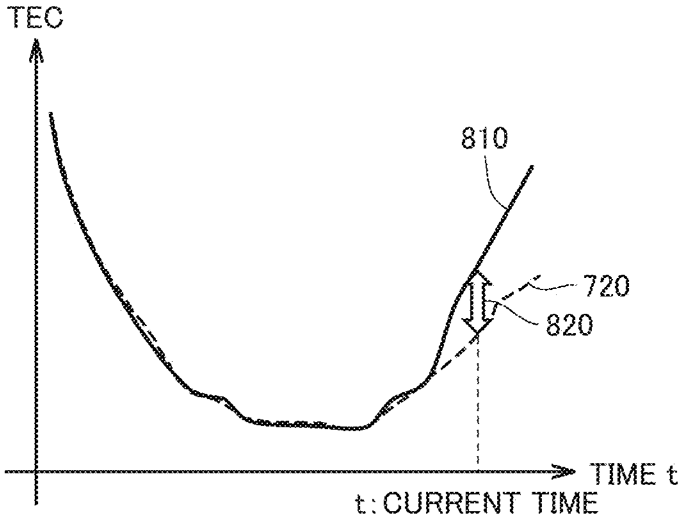
FIG. 8 is a graph illustrating an example of a procedure of calculating an estimation error (difference) between a predicted value and an actual measured value of the central observation station.

FIG. 8 is a graph illustrating an example of a procedure of calculating an estimation error (difference) between a predicted value and an actual measured value of the central observation station. The processing illustrated in FIG. 8 can be executed by estimation error calculation unit 450. Estimation error calculation unit 450 compares a value of regression model 720 of the central observation station at time t (a predicted value of a TEC value of the central observation station at time t) with a value of an actual measured value 810 of the central observation station at time t (an actual measured value of a TEC value of the central observation station at time t), and calculates an estimation error 820.

Estimation error 820 being large means that a TEC value observed at the central observation station is greatly different from a TEC value predicted to be observed at the central observation station in normal times. In other words, estimation error 820 being large can indicate a possibility that a factor (for example, a large earthquake or the like) that varies the TEC value has occurred near the central observation station. Abnormality detection device 320 can determine whether or not the actual measured value of the central observation station is abnormal, on the basis of the calculated estimation error 820. More specifically, abnormality detection device 320 calculates a correlation value and a relative value of the central observation station on the basis of estimation error 820. Furthermore, abnormality detection device 320 can determine that the actual measured value of the central observation station is abnormal, on the basis of a fact that either the correlation value or the relative value is greater than or equal to a predetermined threshold value.

Usually, a TEC value observed by observation station 110 may vary due to an effect of various natural phenomena. Therefore, even if only a change in a TEC value of one observation station 110 is observed, it is not possible to determine whether the change is caused by an effect of a natural phenomenon in a wide range or an effect of a natural phenomenon in a local range. Therefore, abnormality detection device 320 according to the present embodiment generates a regression model of the central observation station on the basis of observation results of TEC values of the peripheral observation stations. Since the regression model of the central observation station is generated on the basis of the observation results of the TEC values of the peripheral observation stations, the regression model is less susceptible to an effect of a local natural phenomenon occurring near the central observation station. Therefore, estimation error 820 being large means that the predicted value is not affected by a natural phenomenon in a wide range and the actual measured value is affected by a natural phenomenon in a local range, and can indicate that there is a high possibility that a local natural phenomenon (such as a large earthquake) has occurred.

Figure 9:
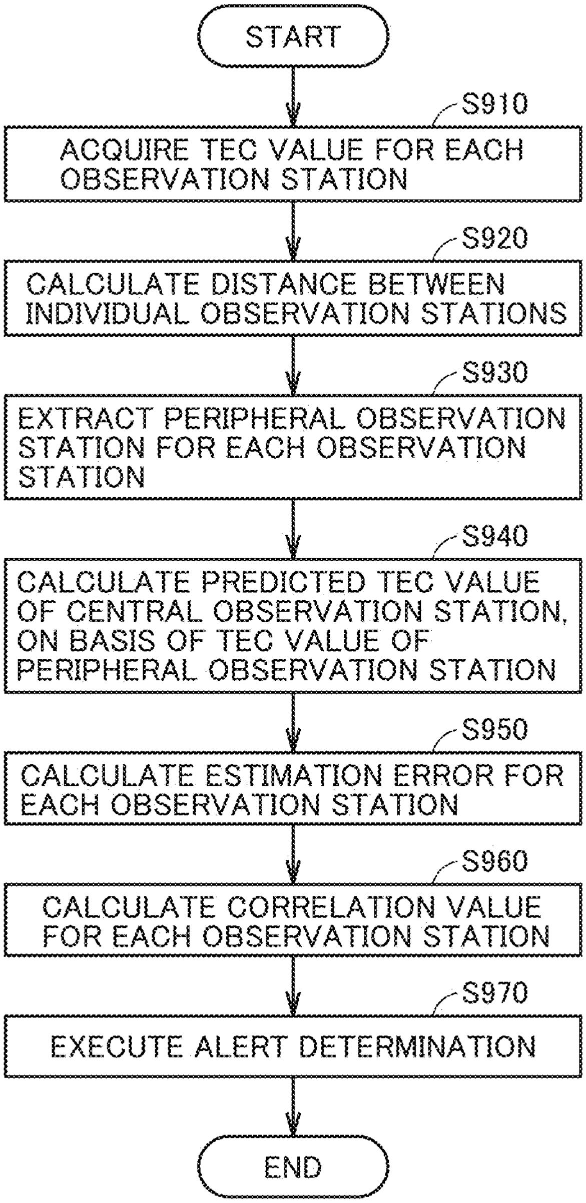
FIG. 9 is a flowchart illustrating an example of a flow of processing of abnormality determination of a TEC value by abnormality detection device 320.

FIG. 9 is a flowchart illustrating an example of a flow of processing of abnormality determination of a TEC value by abnormality detection device 320. In one aspect, CPU 501 may read a program for performing the processing of FIG. 9 from secondary storage device 503 into primary storage device 502, and execute the program. In another aspect, a part or all of the processing can be realized as a combination of circuit elements configured to execute the processing.

In step S910, CPU 501 acquires a TEC value for each observation station 110. In one aspect, CPU 501 can acquire the TEC value for each observation station 110 via external device interface 504, input interface 505, or communication interface 507. In another aspect, CPU 501 may acquire the TEC value for each observation station 110 from observation data DB 310. In another aspect, CPU 501 may calculate the TEC value for each observation station 110 on the basis of data acquired from observation data DB 310.

In step S920, CPU 501 calculates a distance between individual observation stations 110. More specifically, CPU 501 refers to observation station position data DB 410, to acquire position information about each observation station 110. CPU 501 calculates the distance between individual observation stations 110 on the basis of the acquired position information about observation stations 110. CPU 501 stores the calculated distance information into inter-observation-station distance data DB 430. In one aspect, observation station position data DB 410 and inter-observation-station distance data DB 430 may be disposed in secondary storage device 503.

In step S930, CPU 501 extracts a peripheral observation station for each observation station 110 (for each central observation station). More specifically, CPU 501 selects a central observation station and extracts a plurality of peripheral observation stations for the central observation station. The processing of this step corresponds to the processing described with reference to FIG. 6.

In step S940, CPU 501 calculates a predicted value of an observation value (TEC value) of the central observation station, on the basis of the TEC values of the peripheral observation stations. More specifically, CPU 501 generates a regression model of the TEC value of the central observation station, on the basis of the TEC values of the peripheral observation stations extracted in step S930. A TEC value of the regression model at time t is a predicted TEC value (predicted value of the TEC value) of the central observation station at time t. The processing of this step corresponds to the processing described with reference to FIG. 7.

In step S950, CPU 501 calculates estimation error 820 for each observation station 110. More specifically, CPU 501 compares a predicted value indicated by the regression model generated in step S940 with an actual measured value of the TEC value of the central observation station, and calculates an estimation error (difference between the predicted value and the actual measured value). The processing of this step corresponds to the processing described with reference to FIG. 8.

In step S960, CPU 501 calculates a correlation value for each observation station 110. In addition, CPU 501 calculates a relative value for each observation station 110 on the basis of the correlation value. The processing of this step corresponds to the processing executed by correlation value calculation unit 460.

In step S970, CPU 501 executes alert determination. More specifically, CPU 501 can determine whether or not the correlation value or the relative value calculated in step S960 is greater than or equal to a predetermined threshold value. When the correlation value or the relative value calculated in step S960 is greater than or equal to the predetermined threshold value, CPU 501 outputs an alert. If not, CPU 501 may not output the alert or may output a notification indicating that there is no abnormality in the observed TEC value. The processing of this step corresponds to the processing executed by abnormality determination unit 470 and notification unit 480. The above processing in steps S910 to S970 can be repeatedly executed for each of all observation stations 110.

Next, with reference to FIGS. 10 to 15, a description will be given to a comparison result between a detection result of an abnormality in a TEC value obtained by abnormality detection device 320 and a detection result of an abnormality in a TEC value obtained by a conventional device (the device described in PTL 1), in a case where a simulation of abnormality detection of a TEC value in Japan under the same conditions is performed.

Figure 10:
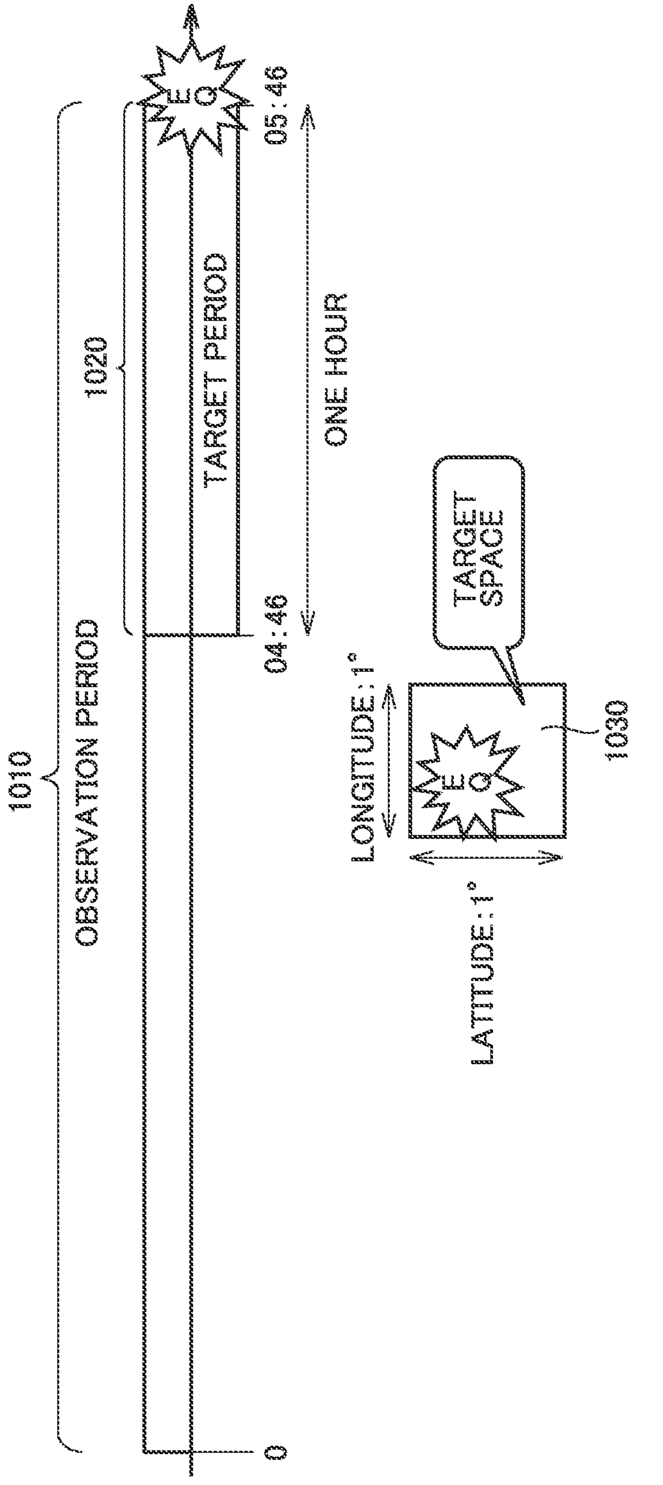
FIG. 10 is a view illustrating an example of conditions for a simulation of abnormality detection processing of a TEC value by abnormality detection device 320.

FIG. 10 is a view illustrating an example of conditions for a simulation of abnormality detection processing of a TEC value by abnormality detection device 320. The conditions illustrated in FIG. 10 are obtained by using data when a large earthquake has occurred in the past. "Observation period 1010" is a period from UTC 00:00 to the occurrence of the earthquake. In other words, observation period 1010 is a simulation execution period.

"Target period 1020" is a period from one hour before the occurrence of the earthquake to the occurrence of the earthquake. In other words, target period 1020 is a period in which there is a high possibility that an abnormality occurs in the TEC value due to an effect of the earthquake.

"Target space 1030" is a space where latitude and longitude including an earthquake center are within one degree. In other words, target space 1030 is an area where the earthquake has occurred, and is a space in which an abnormality is considered to occur in the TEC value in the sky above due to an effect of the earthquake.

It is desirable that abnormality detection device 320 and the conventional device detect an abnormality in the TEC value in the sky above target space 1030 within target period 1020, and output an alert. This is because detecting the abnormality in the TEC value in the sky above target space 1030 within target period 1020 means detecting a change in the TEC value due to the earthquake.

In the simulation, abnormality detection device 320 and the conventional device can use observation results of TEC values calculated from all observation stations 110 and all the satellites throughout Japan during the observation period. For example, abnormality detection device 320 and the conventional device may acquire observation results of TEC values every 30 seconds, including a combination of about 1,300 observation stations 110 and GNSS satellites 100. In practice, each of the plurality of observation stations 110 can receive communication from each of the plurality of GNSS satellites 100.

FIG. 11 is a view illustrating an example of a simulation execution result of each of abnormality detection device 320 and the conventional device. An experimental result 1100A is an output result of abnormality detection device 320. An experimental result 1100B is an output result of the conventional device.

A cell S1 of "Target, Alert present" indicates the number of times each device has detected an abnormality in a TEC value and output an alert in the sky above target space 1030 within target period 1020. In other words, cell S1 of "Target, Alert present" indicates the number of times each device detects an abnormality in a TEC value in the sky above the vicinity of the earthquake center and outputs the alert when the earthquake occurs (including immediately before the occurrence of the earthquake). For example, according to a cell S1A of "Target, Alert present", abnormality detection device 320 detects an abnormality in a TEC value in the sky above target space 1030 within target period 1020 and outputs the alert, for 738 times. According to a cell S1B of "Target, Alert present", the conventional device detects an abnormality in a TEC value in the sky above target space 1030 within target period 1020 and outputs the alert, for 847 times.

A cell S2 of "Target, No alert" indicates the number of times each device has not detected an abnormality in a TEC value in the sky above target space 1030 within target period 1020 and has not output an alert. In other words, cell S2 of "Target, No alert" indicates the number of times each device has not detected an abnormality in a TEC value in the sky above the vicinity of the earthquake center when the earthquake occurs (including immediately before the occurrence of the earthquake).

A cell S3 of "Not target, Alert present" indicates a sum of the number of times each device has detected an abnormality in a TEC value and output an alert in a period outside target period 1020 and the number of times each device has detected an abnormality in a TEC value and output an alert within target period 1020 but in the sky above a place outside target space 1030. In other words, cell S3 of "Not target, Alert present" indicates a sum of the number of times each device has detected an abnormality in a TEC value in a period in which an earthquake does not occur and output an alert, and the number of times each device has detected an abnormality in a TEC value in the sky above an area other than the earthquake center and output an alert when the earthquake occurs (including immediately before the occurrence of the earthquake).

A cell S4 of "Not target, No alert" indicates a sum of the number of times each device has not detected an abnormality in a TEC value in a period outside target period 1020 and the number of times each device has not detected an abnormality in a TEC value in the sky above a place outside target space 1030 within target period 1020.

The sum of cells S1A to S4A described above indicates the number of times abnormality detection device 320 has repeated the processing (abnormality determination processing of the TEC value) illustrated in FIG. 9 during observation period 1010. Similarly, the sum of cells S1B to S4B described above indicates the number of times the conventional device has repeated the abnormality determination processing of the TEC value during observation period 1010.

FIG. 12 is a view illustrating an example of an analysis result of a simulation execution result. An analysis result 1200A indicates an analysis result of experimental result 1100A of abnormality detection device 320. An analysis result 1200B indicates an analysis result of experimental result 1100B of the conventional device. Hereinafter, S1, S2, S3, and S4 in analysis results 1200A and 1200B indicate numerical values of cell S1, cell S2, cell S3, and cell S4, respectively.

A reproduction rate is a probability of outputting an alert for a precursor phenomenon, and a larger reproduction rate is more favorable. The "precursor phenomenon" here indicates a change in a TEC value expected to be observed in the sky above the vicinity of the earthquake center in a period from immediately before the occurrence of the earthquake to the occurrence of the earthquake. In the case of the simulation this time, the reproduction rate is a probability of detecting an abnormality in the TEC value in the sky above the vicinity of the earthquake center when there is a precursor phenomenon (occurrence of an earthquake and a precursor thereof). The reproduction rate is obtained as follows.

$$\text{Reproduction rate}=S1/(S1+S2)$$

A matching rate is a probability that, when an alert is output, the alert is an alert based on a precursor phenomenon, and a larger matching rate is more favorable. In the case of the simulation this time, the matching rate is a probability of outputting an alert on the basis of a certain precursor phenomenon (occurrence of an earthquake and a precursor thereof). The matching rate is obtained as follows.

$$\text{Matching rate}=S1/(S1+S3)$$

A specificity is a probability that no alert is output in normal times, and a larger specificity is more favorable. In the case of the simulation this time, the specificity is a probability that an alert is not output when there is no precursor phenomenon (occurrence of an earthquake and a precursor thereof). The specificity is obtained as follows.

$$\text{Specificity}=S4/(S3+S4)$$

An accuracy indicates a degree of correct determination overall, and a larger accuracy is more favorable. The accuracy is obtained as follows.

$$\text{Accuracy}=(S1+S4)/(S1+S2+S3+S4)$$

An F value indicates a degree of correctness of determination in a case where a degree of data imbalance is taken into consideration, and a larger F value is more favorable. The F value is obtained as follows. In the case of the simulation this time, the accuracy and the F value indicate a level of prediction accuracy of a precursor phenomenon (occurrence of an earthquake and a precursor thereof).

$$F\text{ value}=2/(1/\text{reproduction rate}+1/\text{matching rate})$$

A false negative rate is a probability of overlooking a precursor phenomenon, and a smaller false negative rate is more favorable. In the case of the simulation this time, the false negative rate is a probability of outputting an alert when there is a precursor phenomenon (occurrence of an earthquake and a precursor thereof). The false negative rate is obtained as follows.

$$\text{False negative rate}=S2/(S1+S2)$$

A false positive rate is a probability of outputting false reporting, and a smaller false positive rate is more favorable. In the case of the simulation this time, the false positive rate is a probability of outputting an alert when there is no precursor phenomenon (occurrence of an earthquake and a precursor thereof). The false positive rate is obtained as follows.

$$\text{False positive rate}=S3/(S3+S4)$$

Referring to analysis results 1200A and 1200B, abnormality detection device 320 indicates favorable results in the matching rate, the specificity, the accuracy, the F value, and the false positive rate as compared with the conventional device. From this point, it can be seen that abnormality detection device 320 has higher accuracy in abnormality determination of a TEC value than the conventional device.

Figure 13:
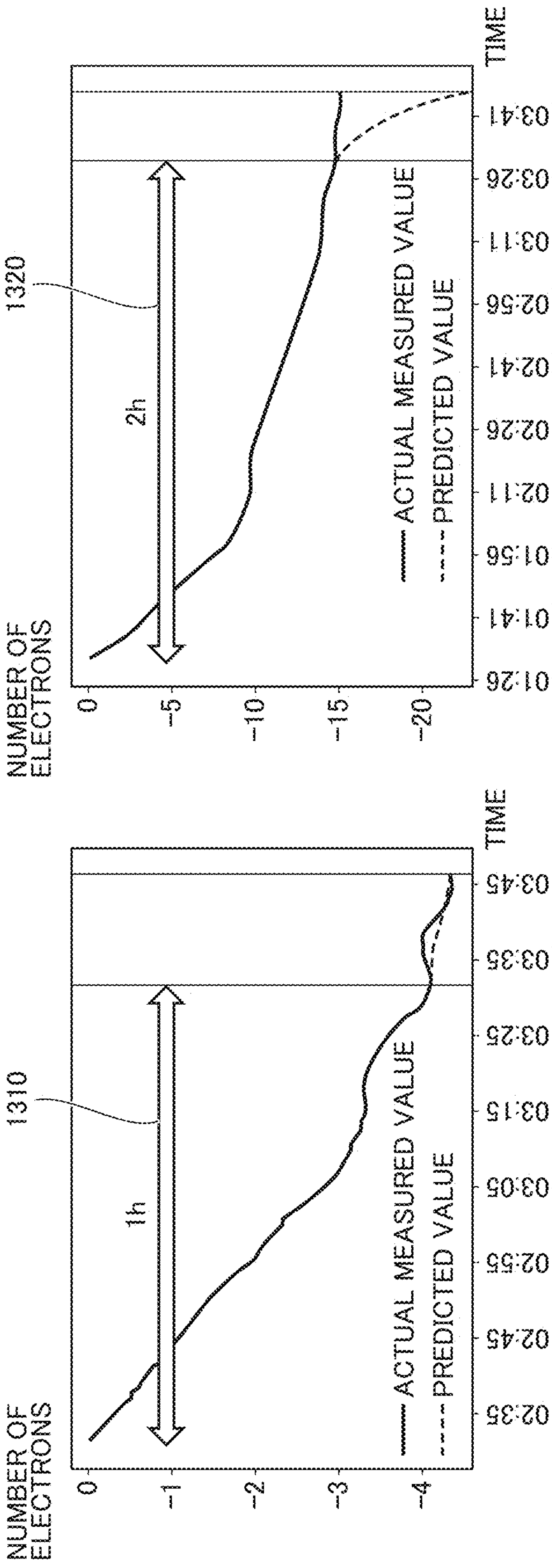
FIG. 13 is a graph illustrating an example of a sampling period of abnormality detection device 320 and the conventional device.

FIG. 13 is a graph illustrating an example of a sampling period of abnormality detection device 320 and the conventional device. The sampling period is usually required to generate a regression model. A sampling period 1310 of abnormality detection device 320 requires only about a half period as compared with a sampling period 1320 of the conventional device. Furthermore, as illustrated in FIG. 12, since the accuracy of the regression model is higher than that of the conventional technology even in a sampling period that is about half of that of the conventional device (even with a small number of samplings), abnormality detection device 320 can detect an abnormality in a TEC value with accuracy greater than or equal to that of the conventional technology.

Figure 14:
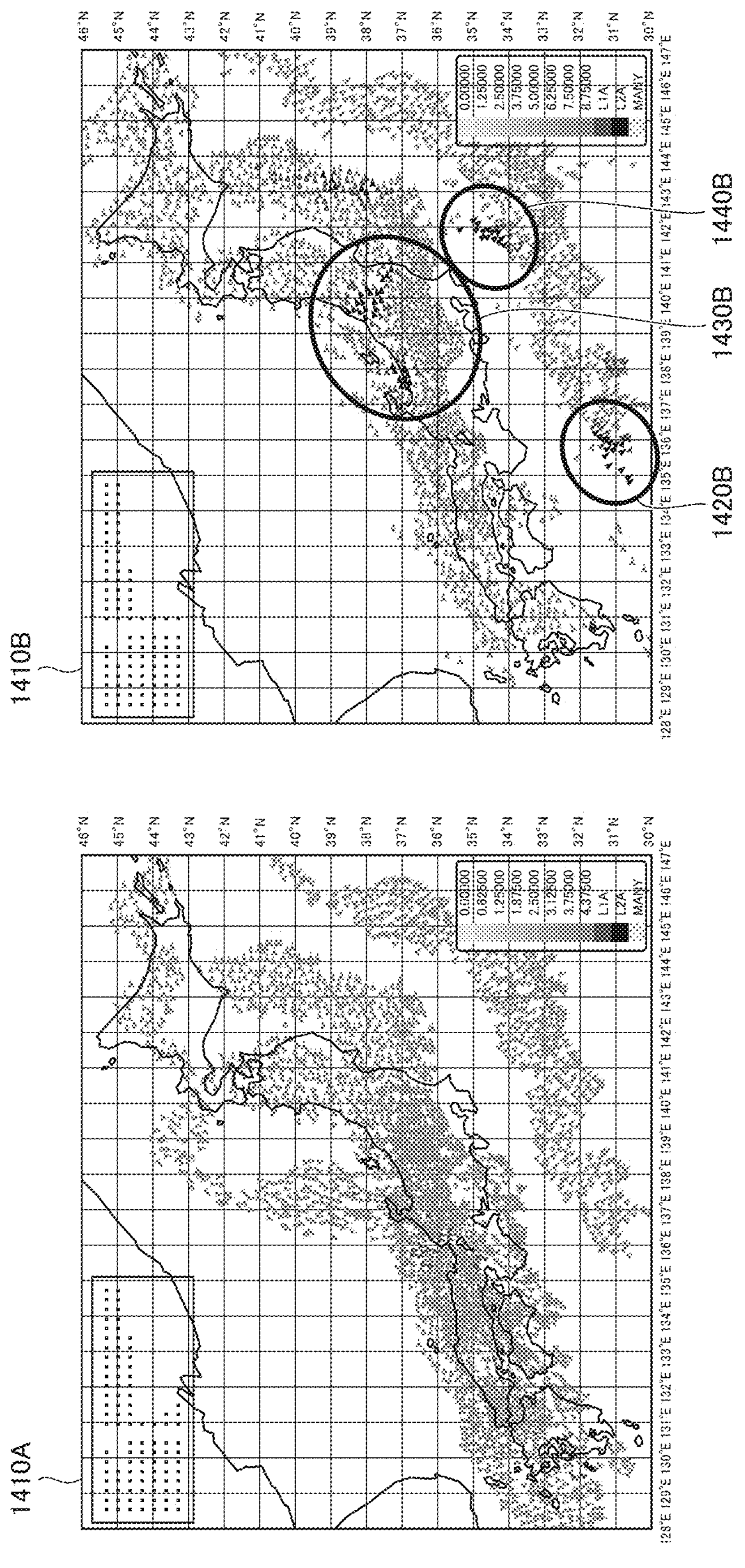
FIG. 14 is a view illustrating a first example of comparison between an alert output by abnormality detection device 320 and an alert output by the conventional device.

FIG. 14 is a view illustrating a first example of comparison between an alert output by abnormality detection device 320 and an alert output by the conventional device. An indication 1410A is an indication of an alert output by abnormality detection device 320 in a period in which no earthquake occurs in the simulation. An indication 1410B is an indication of an alert output by the conventional device in a period in which no earthquake occurs in the simulation. Triangles plotted on indications 1410A and 1410B indicate an intensity of the alert.

In comparing indications 1410A and 1410B, a high intensity alert is output in regions 1420B, 1430B, and 1440B in indication 1410B. On the other hand, no high intensity alert is indicated on indication 1410A, and it can be seen that abnormality detection device 320 has higher accuracy of the regression model and less false reporting as compared with the conventional device.

Figure 15:
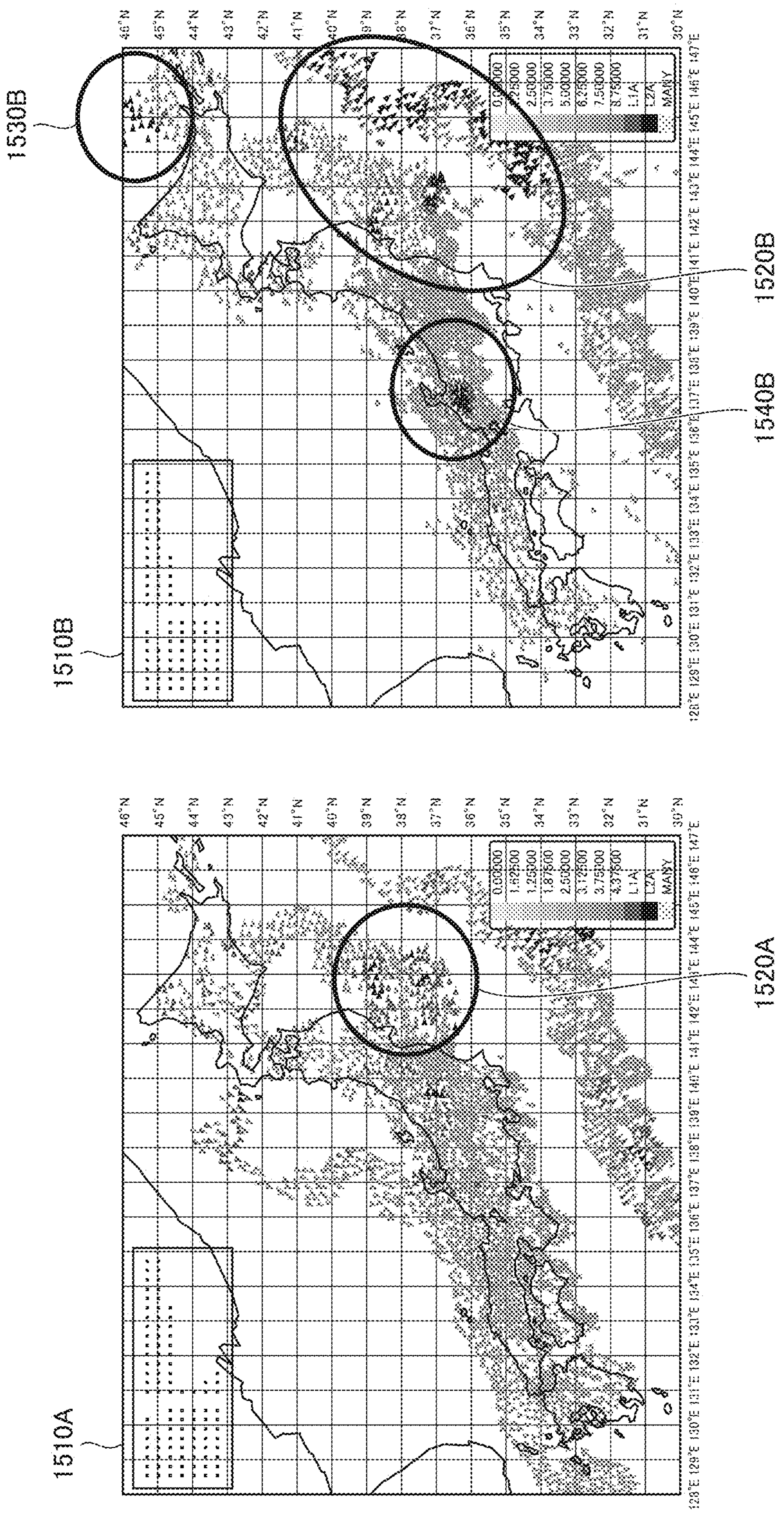
FIG. 15 is a view illustrating a second example of comparison between an alert output by abnormality detection device 320 and an alert output by the conventional device.

FIG. 15 is a view illustrating a second example of comparison between an alert output by abnormality detection device 320 and an alert output by the conventional device. An indication 1510A is an indication of an alert output by abnormality detection device 320 in a period in which an earthquake occurs in the simulation (including immediately before the occurrence of the earthquake). An indication 1510B is an indication of an alert output by the conventional device in a period in which an earthquake occurs in the simulation (including immediately before the occurrence of the earthquake).

In comparing indications 1510A and 1510B, in indication 1510B, high intensity alerts are indicated at three locations of regions 1520B, 1530B, and 1540B. Whereas in indication 1510A, a high intensity alert is indicated at one location of a region 1520A. That is, it can be seen that abnormality detection device 320 can accurately detect an abnormality in a TEC value in a narrower range as compared with the conventional device.

As described above, abnormality detection device 320 according to the present embodiment generates a regression model of a central observation station on the basis of TEC values of peripheral observation stations selected from around the central observation station. Then, abnormality detection device 320 calculates an estimation error by comparing a predicted value of the regression model with an actual measured value of the central observation station, and predicts an abnormality in the TEC value on the basis of the estimation error. As a result, abnormality detection device 320 can detect an abnormality in a TEC value with higher accuracy than before (a ratio of false reporting of abnormality detection of the TEC value is reduced). Note that, it is known that a phenomenon in the ionosphere causes various effects on social infrastructure including communication and radio. Therefore, the technology for detecting an abnormality in a TEC value according to the present embodiment can also be utilized for an ionospheric abnormality observation technology in operating the social infrastructure, model construction of space weather, observation of plasma turbulence and change, and the like.

It is to be understood that the embodiments that have been disclosed herein are not restrictive, but are illustrative in all respects. The scope of the present disclosure is defined not by the description above but by the claims, and it is intended to include all modifications within the meaning and scope equivalent to the claims. In addition, the contents of disclosure described in the embodiments and each modification are intended to be implemented alone or in combination as much as possible.

REFERENCE SIGNS LIST

100: GNSS satellite, 110: observation station, 120: ionosphere, 300: abnormality detection system, 310: observation data DB, 320: abnormality detection device, 330: service provider, 340: user terminal, 350: network, 410: observation station position data DB, 420: inter-observation-station distance calculation unit, 430: inter-observation-station distance data DB, 440: value estimation unit, 450: estimation error calculation unit, 460: correlation value calculation unit, 470: abnormality determination unit, 480: notification unit, 501: CPU, 502: primary storage device, 503: secondary storage device, 504: external device interface, 505: input interface, 506: output interface, 507: communication interface, 610, 620, 1420B, 1430B, 1440B, 1520A, 1520B, 1530B, 1540B: region, 630: first distance, 640: second distance, 710B, 710C: actual measured value, 720: regression model, 810: actual measured value, 820: estimation error, 1010: observation period, 1020: target period, 1030: target space, 1100A, 1100B: experimental result, 1200A, 1200B: analysis result, 1310, 1320: sampling period, 1410A, 1410B, 1510A, 1510B: indication

What is claimed is:

1. An abnormality detection device comprising:

an input unit that acquires an observation value of a number of electrons at each of a plurality of observation stations that are for observation of a number of electrons in an ionosphere; and a controller that determines an abnormality in the observation value of the number of electrons, wherein the controller performs:

selecting a central observation station from among the plurality of observation stations;

selecting a plurality of peripheral observation stations from among the plurality of observation stations based on a distance from the central observation station;

calculating a predicted observation value of a number of electrons at the central observation station based on the observation value of the number of electrons at each of the plurality of peripheral observation stations;

calculating an estimation error between the predicted observation value of the number of electrons and an actual measured value of the number of electrons at the central observation station; and determining whether or not the actual measured value of the number of electrons at the central observation station is abnormal, based on the estimation error and a threshold value to detect an electromagnetic abnormality in the ionosphere in a sky above the central observation station.

2. The abnormality detection device according to claim 1, further comprising a storage unit that stores information about a first distance and information about a second distance, wherein the selecting the plurality of peripheral observation stations from among the plurality of observation stations based on a distance from the central observation station includes selecting the plurality of peripheral observation stations from a region in which a distance from the central observation station is greater than or equal to the first distance and less than or equal to the second distance.

3. The abnormality detection device according to claim 2, wherein the storage unit further stores information about a third distance, and the selecting the plurality of peripheral observation stations from among the plurality of observation stations based on a distance from the central observation station includes:

determining each of the peripheral observation stations as a virtual weight;

calculating a position of a center of gravity of a weight of the selected plurality of peripheral observation stations; and selecting the plurality of peripheral observation stations such that a distance from the central observation station to the center of gravity is less than or equal to the third distance.

4. The abnormality detection device according to claim 1, wherein the calculating the predicted observation value of the central observation station based on the observation value of each of the plurality of peripheral observation stations includes calculating the predicted observation value of the central observation station based on an average value of the observation values of the plurality of peripheral observation stations.

5. The abnormality detection device according to claim 1, wherein the calculating the predicted observation value of the central observation station based on the observation value of each of the plurality of peripheral observation stations includes calculating the predicted observation value of the central observation station based on a median value of the observation values of the plurality of peripheral observation stations.

6. The abnormality detection device according to claim 1, wherein the selecting the central observation station includes selecting each of observation stations included in the plurality of observation stations as the central observation station, and the calculating the estimation error includes repeatedly calculating the estimation error when each of the observation stations is selected as the central observation station.

7. The abnormality detection device according to claim 6, wherein the determining whether or not the actual measured value of the central observation station is abnormal based on the estimation error includes:

calculating a correlation value between the estimation error of the central observation station and the estimation errors of a plurality of the observation stations present around the central observation station; and determining that the actual measured value of the central observation station is abnormal based on a fact that the correlation value is greater than or equal to a predetermined threshold value.

8. The abnormality detection device according to claim 6, wherein the determining whether or not the actual measured value of the central observation station is abnormal based on the estimation error includes:

calculating a correlation value between the estimation error of the central observation station and the estimation errors of a plurality of the observation stations present around the central observation station;

calculating a median value and a standard deviation of the correlation values of the central observation station;

calculating a relative value indicating a degree of difference between the correlation value and the median value of the central observation station, based on the median value and the standard deviation; and determining that the actual measured value of the central observation station is abnormal based on a fact that the relative value is greater than or equal to a predetermined threshold value.

9. The abnormality detection device according to claim 1, further comprising an output unit that outputs an alert, wherein the output unit outputs an alert based on a fact that the actual measured value of the central observation station is determined to be abnormal.

10. A method for detecting an abnormality in a number of electrons in an ionosphere, the method comprising:

acquiring an observation value of a number of electrons at each of a plurality of observation stations that are for observation of a number of electrons in an ionosphere;

selecting a central observation station from among the plurality of observation stations;

selecting a plurality of peripheral observation stations from among the plurality of observation stations based on a distance from the central observation station;

calculating a predicted observation value of a number of electrons at the central observation station based on the observation value of the number of electrons at each of the plurality of peripheral observation stations;

calculating an estimation error between the predicted observation value of the number of electrons and an actual measured value of the number of electrons at the central observation station; and determining whether or not the actual measured value of the number of electrons at the central observation station is abnormal, based on the estimation error and a threshold value to detect an electromagnetic abnormality in the ionosphere in a sky above the central observation station.

11. The method according to claim 10, wherein the selecting the plurality of peripheral observation stations from among the plurality of observation stations based on a distance from the central observation station includes selecting the plurality of peripheral observation stations from a region in which a distance from the central observation station is greater than or equal to a first distance and less than or equal to a second distance.

12. The method according to claim 11, wherein the selecting the plurality of peripheral observation stations from among the plurality of observation stations based on a distance from the central observation station includes:

determining each of the peripheral observation stations as a virtual weight;

calculating a position of a center of gravity of a weight of the selected plurality of peripheral observation stations; and selecting the plurality of peripheral observation stations such that a distance from the central observation station to the center of gravity is less than or equal to a third distance.

13. The method according to claim 10, wherein the calculating the predicted observation value of the central observation station based on the observation value of each of the plurality of peripheral observation stations includes calculating the predicted observation value of the central observation station based on an average value of the observation values of the plurality of peripheral observation stations.

14. The method according to claim 10, wherein the calculating the predicted observation value of the central observation station based on the observation value of each of the plurality of peripheral observation stations includes calculating the predicted observation value of the central observation station based on a median value of the observation values of the plurality of peripheral observation stations.

15. The method according to claim 10, wherein the selecting the central observation station includes selecting each of observation stations included in the plurality of observation stations as the central observation station, and the calculating the estimation error includes repeatedly calculating the estimation error when each of the observation stations is selected as the central observation station.

16. The method according to claim 15, wherein the determining whether or not the actual measured value of the central observation station is abnormal based on the estimation error includes:

calculating a correlation value between the estimation error of the central observation station and the estimation errors of a plurality of the observation stations present around the central observation station; and determining that the actual measured value of the central observation station is abnormal based on a fact that the correlation value is greater than or equal to a predetermined threshold value.

17. The method according to claim 15, wherein the determining whether or not the actual measured value of the central observation station is abnormal based on the estimation error includes:

calculating a correlation value between the estimation error of the central observation station and the estimation errors of a plurality of the observation stations present around the central observation station;

calculating a median value and a standard deviation of the correlation values of the central observation station;

calculating a relative value indicating a degree of difference between the correlation value and the median value of the central observation station, based on the median value and the standard deviation; and determining that the actual measured value of the central observation station is abnormal based on a fact that the relative value is greater than or equal to a predetermined threshold value.

18. The method according to claim 10, further comprising outputting an alert based on a fact that the actual measured value of the central observation station is determined to be abnormal.

19. A non-transitory computer-readable medium storing a program for causing a computer to execute a method, the method comprising:

acquiring an observation value of a number of electrons at each of a plurality of observation stations that are for observation of a number of electrons in an ionosphere;

selecting a central observation station from among the plurality of observation stations;

selecting a plurality of peripheral observation stations from among the plurality of observation stations based on a distance from the central observation station;

calculating a predicted observation value of a number of electrons at the central observation station based on the observation value of the number of electrons at each of the plurality of peripheral observation stations;

calculating an estimation error between the predicted observation value of the number of electrons and an actual measured value of the number of electrons at the central observation station; and determining whether or not the actual measured value of the number of electrons at the central observation station is abnormal, based on the estimation error and a threshold value to detect an electromagnetic abnormality in the ionosphere in a sky above the central observation station.

20. The non-transitory computer-readable medium according to claim 19, wherein the selecting the plurality of peripheral observation stations from among the plurality of observation stations based on a distance from the central observation station includes selecting the plurality of peripheral observation stations from a region in which a distance from the central observation station is greater than or equal to a first distance and less than or equal to a second distance.

* * * * *